(12) United States Patent
Benson

(10) Patent No.: US 9,661,021 B2
(45) Date of Patent: *May 23, 2017

(54) SYSTEM AND METHOD FOR ANTI-PHISHING AUTHENTICATION

(71) Applicant: JPMorgan Chase Bank, N.A., New York, NY (US)

(72) Inventor: Glenn S. Benson, Newton, MA (US)

(73) Assignee: JPMorgan Chase Bank, N.A., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/157,515

(22) Filed: May 18, 2016

(65) Prior Publication Data

US 2016/0261630 A1 Sep. 8, 2016

Related U.S. Application Data

(63) Continuation of application No. 14/051,079, filed on Oct. 10, 2013, now Pat. No. 9,374,366, which is a
(Continued)

(51) Int. Cl.
*H04L 29/06* (2006.01)
*G06F 21/34* (2013.01)
*H04L 9/32* (2006.01)

(52) U.S. Cl.
CPC .......... *H04L 63/1483* (2013.01); *G06F 21/34* (2013.01); *H04L 63/061* (2013.01);
(Continued)

(58) Field of Classification Search
None
See application file for complete search history.

(56) References Cited

U.S. PATENT DOCUMENTS 3,705,385 A 12/1972 Batz
3,860,870 A 1/1975 Furuya
(Continued)

FOREIGN PATENT DOCUMENTS

CA 2439549 6/2002
DE 19731293 1/1999
(Continued)

OTHER PUBLICATIONS

Philip Carden, The New Face of Single Sign-On, Network Computing (Mar. 22, 1999), http://www.networkcomputing.com/1006/1006f1.html.
(Continued)

*Primary Examiner* — Kaveh Abrishamkar
(74) *Attorney, Agent, or Firm* — Goodwin Procter LLP

(57) ABSTRACT

A method and system for providing security against phishing attacks. The method can include receiving a login ID from a client, and providing an encrypted commitment to the client. The method can also include receiving a one-time password (OTP) from the client, and validating the OTP. The method can also include sending a commitment key, to be authenticated by the client, receiving a static password from the client and authenticating the client. Embodiments of the invention are directed to a system for providing security against phishing attacks. The system can include one or more servers configured to receive a login ID from a client, and provide an encrypted commitment to the client. The processors can be configured to receive a one-time password (OTP) from the client, validate the OTP, send a commitment key, to be authenticated by the client, receive a static password from the client and authenticate the client.

20 Claims, 4 Drawing Sheets

Related U.S. Application Data continuation of application No. 11/411,576, filed on Apr. 26, 2006, now Pat. No. 8,583,926.

(60) Provisional application No. 60/718,503, filed on Sep. 19, 2005.

(52) U.S. Cl.
  CPC ...... H04L 63/0823 (2013.01); H04L 63/0838 (2013.01); H04L 63/0846 (2013.01); *G06F 2221/2119* (2013.01); *H04L 9/3228* (2013.01); *H04L 63/1475* (2013.01)

(56) References Cited

U.S. PATENT DOCUMENTS

| | | |
|---|---|---|
| 3,896,266 A | 7/1975 | Waterbury |
| 3,938,091 A | 2/1976 | Atalla et al. |
| 4,013,962 A | 3/1977 | Beseke et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,212,792 A | 5/1993 | Gerety et al. |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,315,504 A | 5/1994 | Lembie |
| 5,317,683 A | 5/1994 | Hager et al. |
| 5,321,841 A | 6/1994 | East et al. |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Change |
| 5,479,530 A | 12/1995 | Nair et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davies et al. |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakely et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scarmer |
| 5,642,419 A | 6/1997 | Rosen |
| 5,644,493 A | 7/1997 | Motai |
| 5,644,778 A | 7/1997 | Burks et al. |
| 5,649,118 A | 7/1997 | Carlisle et al. |
| 5,653,914 A | 8/1997 | Holmes et al. |
| 5,657,383 A | 8/1997 | Gerber |
| 5,659,165 A | 8/1997 | Jennings |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,706,452 A | 1/1998 | Ivanov |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Gray |
| 5,761,647 A | 6/1998 | Boushy |
| 5,761,661 A | 6/1998 | Coussenns |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,781,909 A | 7/1998 | Logan et al. |
| 5,784,562 A | 7/1998 | Diener |
| 5,787,403 A | 7/1998 | Randle |
| 5,787,404 A | 7/1998 | Fernandez-Holman |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid |

(56) References Cited

U.S. PATENT DOCUMENTS

| | | |
|---|---|---|
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A | 9/1998 | Teper et al. |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |
| 5,826,023 A | 10/1998 | Hall et al. |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,211 A | 11/1998 | Blakley, III et al. |
| 5,832,460 A | 11/1998 | Bednar |
| 5,832,476 A | 11/1998 | Tada |
| 5,835,580 A | 11/1998 | Fraser |
| 5,835,603 A | 11/1998 | Coutts |
| 5,838,903 A | 11/1998 | Blakely, III et al. |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,190 A | 12/1998 | Kleehammer et al. |
| 5,848,400 A | 12/1998 | Change |
| 5,848,427 A | 12/1998 | Hyodo |
| 5,852,812 A | 12/1998 | Reeder |
| 5,857,079 A | 1/1999 | Claus et al. |
| 5,862,223 A | 1/1999 | Walker |
| 5,862,323 A | 1/1999 | Blakely, III et al. |
| 5,864,830 A | 1/1999 | Armetta et al. |
| 5,864,871 A | 1/1999 | Kitain et al. |
| RE36,116 E | 2/1999 | McCarthy |
| 5,866,889 A | 2/1999 | Weiss et al. |
| 5,870,718 A | 2/1999 | Spector |
| 5,870,725 A | 2/1999 | Belinger et al. |
| 5,871,398 A | 2/1999 | Schneier et al. |
| 5,873,072 A | 2/1999 | Kight |
| 5,873,096 A | 2/1999 | Lim |
| 5,880,769 A | 3/1999 | Nemirofsky |
| 5,884,032 A | 3/1999 | Bateman |
| 5,884,270 A | 3/1999 | Walker et al. |
| 5,884,272 A | 3/1999 | Walker et al. |
| 5,884,274 A | 3/1999 | Walker et al. |
| 5,884,288 A | 3/1999 | Change |
| 5,889,863 A | 3/1999 | Weber |
| 5,892,900 A | 4/1999 | Ginter et al. |
| 5,898,780 A | 4/1999 | Liu et al. |
| 5,899,982 A | 5/1999 | Randle |
| 5,903,881 A | 5/1999 | Schrader |
| 5,909,486 A | 6/1999 | Walker et al. |
| 5,910,988 A | 6/1999 | Ballard |
| 5,913,202 A | 6/1999 | Motoyama |
| 5,914,472 A | 6/1999 | Foladare et al. |
| 5,915,244 A | 6/1999 | Jack et al. |
| 5,918,214 A | 6/1999 | Perkowski |
| 5,918,217 A | 6/1999 | Maggioncalda |
| 5,918,239 A | 6/1999 | Allen et al. |
| 5,920,847 A | 7/1999 | Kolling et al. |
| 5,921,864 A | 7/1999 | Walker et al. |
| 5,923,763 A | 7/1999 | Walker et al. |
| 5,926,796 A | 7/1999 | Walker et al. |
| 5,926,812 A | 7/1999 | Hilsenrath |
| 5,930,764 A | 7/1999 | Melchione |
| 5,933,816 A | 8/1999 | Zeanah |
| 5,933,817 A | 8/1999 | Hucal |
| 5,933,823 A | 8/1999 | Cullen |
| 5,933,827 A | 8/1999 | Cole |
| 5,940,812 A | 8/1999 | Tengel et al. |
| 5,943,656 A | 8/1999 | Crooks |
| 5,944,824 A | 8/1999 | He |
| 5,945,653 A | 8/1999 | Walker et al. |
| 5,946,388 A | 8/1999 | Walker et al. |
| 5,947,747 A | 9/1999 | Walker et al. |
| 5,949,044 A | 9/1999 | Walker et al. |
| 5,949,875 A | 9/1999 | Walker et al. |
| 5,950,173 A | 9/1999 | Perkowski |
| 5,950,174 A | 9/1999 | Brendzel |
| 5,950,206 A | 9/1999 | Krause |
| 5,952,639 A | 9/1999 | Ohki |
| 5,952,641 A | 9/1999 | Korshun |
| 5,953,710 A | 9/1999 | Fleming |
| 5,956,695 A | 9/1999 | Carrithers et al. |
| 5,958,007 A | 9/1999 | Lee et al. |
| 5,960,411 A | 9/1999 | Hartman et al. |
| 5,961,593 A | 10/1999 | Gabber et al. |
| 5,963,635 A | 10/1999 | Szlam et al. |
| 5,963,925 A | 10/1999 | Kolling et al. |
| 5,963,952 A | 10/1999 | Smith |
| 5,963,953 A | 10/1999 | Cram et al. |
| 5,966,695 A | 10/1999 | Melchione et al. |
| 5,966,699 A | 10/1999 | Zandi |
| 5,967,896 A | 10/1999 | Jorasch et al. |
| 5,969,318 A | 10/1999 | Mackenthun |
| 5,970,143 A | 10/1999 | Schneier et al. |
| 5,970,470 A | 10/1999 | Walker et al. |
| 5,970,478 A | 10/1999 | Walker et al. |
| 5,970,482 A | 10/1999 | Pham |
| 5,970,483 A | 10/1999 | Evans |
| 5,978,467 A | 11/1999 | Walker et al. |
| 5,983,196 A | 11/1999 | Wendkos |
| 5,987,434 A | 11/1999 | Libman |
| 5,987,454 A | 11/1999 | Hobbs |
| 5,987,498 A | 11/1999 | Athing et al. |
| 5,991,736 A | 11/1999 | Ferguson et al. |
| 5,991,738 A | 11/1999 | Ogram |
| 5,991,748 A | 11/1999 | Taskett |
| 5,991,751 A | 11/1999 | Rivette et al. |
| 5,991,780 A | 11/1999 | Rivette |
| 5,995,948 A | 11/1999 | Whitford |
| 5,995,976 A | 11/1999 | Walker et al. |
| 5,999,596 A | 12/1999 | Walker et al. |
| 5,999,907 A | 12/1999 | Donner |
| 5,999,971 A | 12/1999 | Buckland |
| 6,000,033 A | 12/1999 | Kelly et al. |
| 6,001,016 A | 12/1999 | Walker et al. |
| 6,003,762 A | 12/1999 | Hayashida |
| 6,005,939 A | 12/1999 | Fortenberry et al. |
| 6,006,205 A | 12/1999 | Loeb et al. |
| 6,006,249 A | 12/1999 | Leong |
| 6,009,415 A | 12/1999 | Shurling et al. |
| 6,009,442 A | 12/1999 | Chen et al. |
| 6,010,404 A | 1/2000 | Walker et al. |
| 6,012,088 A | 1/2000 | Li et al. |
| 6,012,983 A | 1/2000 | Walker et al. |
| 6,014,439 A | 1/2000 | Walker et al. |
| 6,014,635 A | 1/2000 | Harris et al. |
| 6,014,636 A | 1/2000 | Reeder |
| 6,014,638 A | 1/2000 | Burge et al. |
| 6,014,641 A | 1/2000 | Loeb et al. |
| 6,014,645 A | 1/2000 | Cunningham |
| 6,016,476 A | 1/2000 | Maes et al. |
| 6,016,810 A | 1/2000 | Ravenscroft |
| 6,018,714 A | 1/2000 | Risen, Jr. |
| 6,018,718 A | 1/2000 | Walker et al. |
| 6,024,640 A | 2/2000 | Walker et al. |
| 6,026,398 A | 2/2000 | Brown et al. |
| 6,026,429 A | 2/2000 | Jones et al. |
| 6,032,134 A | 2/2000 | Weissman |
| 6,032,147 A | 2/2000 | Williams et al. |

(56) References Cited

U.S. PATENT DOCUMENTS

| | | |
|---|---|---|
| 6,038,547 A | 3/2000 | Casto |
| 6,038,552 A | 3/2000 | Fleischl et al. |
| 6,042,006 A | 3/2000 | Van Tilburg et al. |
| 6,044,362 A | 3/2000 | Neely |
| 6,045,039 A | 4/2000 | Stinson et al. |
| 6,049,778 A | 4/2000 | Walker et al. |
| 6,049,782 A | 4/2000 | Gottesman et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |
| 6,065,120 A | 5/2000 | Laursen et al. |
| 6,065,675 A | 5/2000 | Teicher |
| 6,067,531 A | 5/2000 | Hoyt et al. |
| 6,070,147 A | 5/2000 | Harms et al. |
| 6,070,153 A | 5/2000 | Simpson |
| 6,070,244 A | 5/2000 | Orchier et al. |
| 6,073,105 A | 6/2000 | Sutcliffe et al. |
| 6,073,113 A | 6/2000 | Guinan |
| 6,075,519 A | 6/2000 | Okatani et al. |
| 6,076,072 A | 6/2000 | Libman |
| 6,081,790 A | 6/2000 | Rosen |
| 6,081,810 A | 6/2000 | Rosenzweig et al. |
| 6,081,900 A | 6/2000 | Subramaniam et al. |
| 6,085,168 A | 7/2000 | Mori et al. |
| 6,088,444 A | 7/2000 | Walker et al. |
| 6,088,451 A | 7/2000 | He et al. |
| 6,088,683 A | 7/2000 | Jalili |
| 6,088,686 A | 7/2000 | Walker et al. |
| 6,088,700 A | 7/2000 | Larsen et al. |
| 6,091,817 A | 7/2000 | Bertina et al. |
| 6,092,192 A | 7/2000 | Kanevsky et al. |
| 6,092,196 A | 7/2000 | Reiche |
| 6,095,412 A | 8/2000 | Bertina et al. |
| 6,098,070 A | 8/2000 | Maxwell |
| 6,101,486 A | 8/2000 | Roberts et al. |
| 6,104,716 A | 8/2000 | Crichton et al. |
| 6,105,012 A | 8/2000 | Chang et al. |
| 6,105,865 A | 8/2000 | Hardesty |
| 6,111,858 A | 8/2000 | Greaves et al. |
| 6,112,181 A | 8/2000 | Shear et al. |
| 6,115,642 A | 9/2000 | Brown et al. |
| 6,115,690 A | 9/2000 | Wong |
| 6,119,093 A | 9/2000 | Walker et al. |
| 6,119,099 A | 9/2000 | Walker et al. |
| 6,128,599 A | 10/2000 | Walker et al. |
| 6,128,602 A | 10/2000 | Northington et al. |
| 6,131,810 A | 10/2000 | Weiss et al. |
| 6,134,549 A | 10/2000 | Regnier et al. |
| 6,134,592 A | 10/2000 | Montulli |
| 6,135,349 A | 10/2000 | Zirkel |
| 6,138,106 A | 10/2000 | Walker et al. |
| 6,138,118 A | 10/2000 | Koppstein et al. |
| 6,141,651 A | 10/2000 | Riley et al. |
| 6,141,666 A | 10/2000 | Tobin |
| 6,144,946 A | 11/2000 | Iwamura |
| 6,144,948 A | 11/2000 | Walker et al. |
| 6,145,086 A | 11/2000 | Bellemore et al. |
| 6,148,293 A | 11/2000 | King |
| 6,151,584 A | 11/2000 | Papierniak et al. |
| 6,154,750 A | 11/2000 | Roberge et al. |
| 6,154,879 A | 11/2000 | Pare et al. |
| 6,161,113 A | 12/2000 | Mora et al. |
| 6,161,182 A | 12/2000 | Nadooshan |
| 6,164,533 A | 12/2000 | Barton |
| 6,170,011 B1 | 1/2001 | Macleod Beck et al. |
| 6,178,511 B1 | 1/2001 | Cohen et al. |
| 6,182,052 B1 | 1/2001 | Fulton et al. |
| 6,182,142 B1 | 1/2001 | Win et al. |
| 6,182,220 B1 | 1/2001 | Chen et al. |
| 6,182,225 B1 | 1/2001 | Hagiuda et al. |
| 6,185,242 B1 | 2/2001 | Arthur et al. |
| 6,189,029 B1 | 2/2001 | Fuerst |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,202,066 B1 | 3/2001 | Barkley |
| 6,202,151 B1 | 3/2001 | Musgrave et al. |
| 6,202,158 B1 | 3/2001 | Urano et al. |
| 6,208,978 B1 | 3/2001 | Walker et al. |
| 6,208,984 B1 | 3/2001 | Rosenthan |
| 6,216,115 B1 | 4/2001 | Barrameda et al. |
| 6,219,639 B1 | 4/2001 | Bakis et al. |
| 6,219,706 B1 | 4/2001 | Fan et al. |
| 6,222,914 B1 | 4/2001 | McMullin |
| 6,223,168 B1 | 4/2001 | McGurl et al. |
| 6,226,623 B1 | 5/2001 | Schein et al. |
| 6,226,679 B1 | 5/2001 | Gupta |
| 6,226,752 B1 | 5/2001 | Gupta et al. |
| 6,227,447 B1 | 5/2001 | Campisano |
| 6,230,148 B1 | 5/2001 | Pare et al. |
| 6,243,688 B1 | 6/2001 | Kalina |
| 6,243,816 B1 | 6/2001 | Fang et al. |
| 6,253,327 B1 | 6/2001 | Zhang et al. |
| 6,253,328 B1 | 6/2001 | Smith, Jr. |
| 6,256,664 B1 | 7/2001 | Donoho et al. |
| 6,260,026 B1 | 7/2001 | Tomida et al. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare et al. |
| 6,275,944 B1 | 8/2001 | Kao et al. |
| 6,289,322 B1 | 9/2001 | Kitchen et al. |
| 6,298,330 B1 | 10/2001 | Gardenswartz et al. |
| 6,298,356 B1 | 10/2001 | Jawahar et al. |
| 6,301,567 B1 | 10/2001 | Leong et al. |
| 6,308,273 B1 | 10/2001 | Goertzel et al. |
| 6,308,274 B1 | 10/2001 | Swift |
| 6,311,275 B1 | 10/2001 | Jin et al. |
| 6,317,834 B1 | 11/2001 | Gennaro et al. |
| 6,317,838 B1 | 11/2001 | Baize |
| 6,324,524 B1 | 11/2001 | Lent et al. |
| 6,327,573 B1 | 12/2001 | Walker et al. |
| 6,327,578 B1 | 12/2001 | Linehan |
| 6,330,543 B1 | 12/2001 | Kepecs |
| 6,332,192 B1 | 12/2001 | Boroditsky et al. |
| 6,336,104 B1 | 1/2002 | Walker et al. |
| 6,339,423 B1 | 1/2002 | Sampson et al. |
| 6,343,279 B1 | 1/2002 | Bissonette et al. |
| 6,343,323 B1 | 1/2002 | Kalpio et al. |
| 6,345,261 B1 | 2/2002 | Feidelson |
| 6,349,242 B2 | 2/2002 | Mahaffey |
| 6,349,336 B1 | 2/2002 | Sit et al. |
| 6,363,381 B1 | 3/2002 | Lee et al. |
| 6,366,682 B1 | 4/2002 | Hoffman et al. |
| 6,381,587 B1 | 4/2002 | Guzelsu |
| 6,385,591 B1 | 5/2002 | Mankoff |
| 6,385,652 B1 | 5/2002 | Brown et al. |
| 6,401,125 B1 | 6/2002 | Makarios et al. |
| 6,401,211 B1 | 6/2002 | Brezak, Jr. et al. |
| 6,408,389 B2 | 6/2002 | Grawrock et al. |
| 6,411,933 B1 | 6/2002 | Maes et al. |
| 6,418,457 B1 | 7/2002 | Schmidt et al. |
| 6,438,594 B1 | 8/2002 | Bowman-Amuah |
| 6,438,666 B2 | 8/2002 | Cassagnol et al. |
| 6,446,053 B1 | 9/2002 | Elliott |
| 6,449,765 B1 | 9/2002 | Ballard |
| 6,453,353 B1 | 9/2002 | Win et al. |
| 6,460,141 B1 | 10/2002 | Olden |
| 6,470,357 B1 | 10/2002 | Garcia, Jr. et al. |
| 6,484,149 B1 | 11/2002 | Jammes |
| 6,487,641 B1 | 11/2002 | Cusson et al. |
| 6,490,601 B1 | 12/2002 | Markus et al. |
| 6,493,677 B1 | 12/2002 | Von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,498,657 B1 | 12/2002 | Kuntz et al. |
| 6,507,912 B1 | 1/2003 | Matyas et al. |
| 6,510,523 B1 | 1/2003 | Perlman et al. |
| 6,519,763 B1 | 2/2003 | Kaufer et al. |
| 6,526,404 B1 | 2/2003 | Slater et al. |

(56) References Cited

U.S. PATENT DOCUMENTS

| | | |
|---|---|---|
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,539,424 B1 | 3/2003 | Dutta |
| 6,557,039 B1 | 4/2003 | Leong et al. |
| 6,574,348 B1 | 6/2003 | Venkatesan et al. |
| 6,580,814 B1 | 6/2003 | Ittycheriah et al. |
| 6,581,040 B1 | 6/2003 | Wright et al. |
| 6,584,505 B1 | 6/2003 | Howard et al. |
| 6,584,508 B1 | 6/2003 | Epstein et al. |
| 6,589,291 B1 | 7/2003 | Boag et al. |
| 6,592,044 B1 | 7/2003 | Wong et al. |
| 6,609,106 B1 | 8/2003 | Robertson |
| 6,609,113 B1 | 8/2003 | O'Leary et al. |
| 6,609,125 B1 | 8/2003 | Layne et al. |
| 6,609,198 B1 | 8/2003 | Wood et al. |
| 6,609,654 B1 | 8/2003 | Anderson et al. |
| 6,618,579 B1 | 9/2003 | Smith et al. |
| 6,618,806 B1 | 9/2003 | Brown et al. |
| 6,623,415 B2 | 9/2003 | Gates et al. |
| 6,640,302 B1 | 10/2003 | Subramaniam et al. |
| 6,668,322 B1 | 12/2003 | Wood et al. |
| 6,671,818 B1 | 12/2003 | Mikurak |
| 6,675,261 B2 | 1/2004 | Shandony |
| 6,684,248 B1 | 1/2004 | Janacek et al. |
| 6,684,384 B1 | 1/2004 | Bickerton et al. |
| 6,687,222 B1 | 2/2004 | Albert et al. |
| 6,687,245 B2 | 2/2004 | Fangman et al. |
| 6,697,947 B1 | 2/2004 | Matyas, Jr. et al. |
| 6,714,987 B1 | 3/2004 | Amin et al. |
| 6,718,482 B2 | 4/2004 | Sato et al. |
| 6,718,535 B1 | 4/2004 | Underwood |
| 6,725,269 B1 | 4/2004 | Megiddo |
| 6,735,695 B1 | 5/2004 | Gopalakrishnan et al. |
| 6,738,779 B1 | 5/2004 | Shapira |
| 6,751,654 B2 | 6/2004 | Massarani et al. |
| 6,754,833 B1 | 6/2004 | Black et al. |
| 6,755,341 B1 | 6/2004 | Wong et al. |
| 6,763,388 B1 | 7/2004 | Tsimelzon |
| 6,766,370 B2 | 7/2004 | Glommen et al. |
| 6,769,605 B1 | 8/2004 | Magness |
| 6,772,146 B2 | 8/2004 | Khemlani et al. |
| 6,785,810 B1 | 8/2004 | Lirov et al. |
| 6,789,115 B1 | 9/2004 | Singer et al. |
| 6,792,572 B1 | 9/2004 | Frohlick |
| 6,805,288 B2 | 10/2004 | Routhenstein et al. |
| 6,810,395 B1 | 10/2004 | Bharat |
| 6,819,219 B1 | 11/2004 | Bolle et al. |
| 6,820,202 B1 | 11/2004 | Wheeler et al. |
| 6,826,696 B1 | 11/2004 | Chawla et al. |
| 6,832,202 B1 | 12/2004 | Schuyler et al. |
| 6,832,587 B2 | 12/2004 | Wampula et al. |
| 6,847,991 B1 | 1/2005 | Kurapati |
| 6,856,970 B1 | 2/2005 | Campbell et al. |
| 6,868,391 B1 | 3/2005 | Hultgren |
| 6,892,231 B2 | 5/2005 | Jager |
| 6,907,566 B1 | 6/2005 | McElfresh et al. |
| 6,925,481 B2 | 8/2005 | Singhal et al. |
| 6,934,848 B1 | 8/2005 | King et al. |
| 6,937,976 B2 | 8/2005 | Apte |
| 6,938,158 B2 | 8/2005 | Azuma |
| 6,950,936 B2 | 9/2005 | Subramaniam et al. |
| 6,954,932 B2 | 10/2005 | Nakamura et al. |
| 6,957,337 B1 | 10/2005 | Chainer et al. |
| 6,965,939 B2 | 11/2005 | Cuomo et al. |
| 6,976,164 B1 | 12/2005 | King et al. |
| 6,980,962 B1 | 12/2005 | Arganbright et al. |
| 6,983,421 B1 | 1/2006 | Lahti et al. |
| 6,992,786 B1 | 1/2006 | Breding et al. |
| 7,006,983 B1 | 2/2006 | Packes et al. |
| 7,010,512 B1 | 3/2006 | Gillin et al. |
| 7,020,696 B1 | 3/2006 | Perry et al. |
| 7,032,110 B1 | 4/2006 | Su et al. |
| 7,051,199 B1 | 5/2006 | Berson et al. |
| 7,051,330 B1 | 5/2006 | Kaler et al. |
| 7,058,817 B1 | 6/2006 | Ellmore |
| 7,069,438 B2 | 6/2006 | Balabine et al. |
| 7,076,453 B2 | 7/2006 | Jammes et al. |
| 7,080,036 B1 | 7/2006 | Drummond et al. |
| 7,089,203 B1 | 8/2006 | Crookshanks |
| 7,089,208 B1 | 8/2006 | Levchin et al. |
| 7,089,503 B1 | 8/2006 | Bloomquist et al. |
| 7,093,020 B1 | 8/2006 | McCarty et al. |
| 7,093,282 B2 | 8/2006 | Hillhouse |
| 7,103,556 B2 | 9/2006 | Del Rey et al. |
| 7,117,239 B1 | 10/2006 | Hansen |
| 7,124,101 B1 | 10/2006 | Mikurak |
| 7,134,075 B2 | 11/2006 | Hind |
| 7,137,006 B1 | 11/2006 | Grandcolas et al. |
| 7,139,686 B1 | 11/2006 | Critz |
| 7,185,094 B2 | 2/2007 | Marquette et al. |
| 7,188,181 B1 | 3/2007 | Squier et al. |
| 7,197,470 B1 | 3/2007 | Arnett |
| 7,203,909 B1 | 4/2007 | Horvitz et al. |
| 7,299,201 B2 | 11/2007 | Jammes |
| 7,321,864 B1 | 1/2008 | Gendler |
| 7,370,011 B2 | 5/2008 | Bennett |
| 7,370,350 B1 | 5/2008 | Salowey |
| 7,398,550 B2 | 7/2008 | Zick et al. |
| 7,475,252 B2 | 1/2009 | Jeffries et al. |
| 8,583,926 B1 * | 11/2013 | Benson ............ H04L 63/0838 713/169 |
| 2001/0011255 A1 | 8/2001 | Asay et al. |
| 2001/0012974 A1 | 8/2001 | Mahaffey |
| 2001/0016835 A1 | 8/2001 | Hansmann et al. |
| 2001/0027474 A1 | 10/2001 | Nachman et al. |
| 2001/0029464 A1 | 10/2001 | Schweitzer |
| 2001/0032184 A1 | 10/2001 | Tenembaum |
| 2001/0047295 A1 | 11/2001 | Tenembaum |
| 2001/0051917 A1 | 12/2001 | Bissonette et al. |
| 2001/0054003 A1 | 12/2001 | Chien et al. |
| 2001/0054059 A1 | 12/2001 | Marks et al. |
| 2002/0002479 A1 | 1/2002 | Almog et al. |
| 2002/0007313 A1 | 1/2002 | Mai et al. |
| 2002/0007460 A1 | 1/2002 | Azuma |
| 2002/0010599 A1 | 1/2002 | Levison |
| 2002/0010668 A1 | 1/2002 | Travis et al. |
| 2002/0018585 A1 | 2/2002 | Kim |
| 2002/0019938 A1 | 2/2002 | Aarons |
| 2002/0023108 A1 | 2/2002 | Daswani et al. |
| 2002/0029269 A1 | 3/2002 | McCarty et al. |
| 2002/0032613 A1 | 3/2002 | Buettgenbach et al. |
| 2002/0032650 A1 | 3/2002 | Hauser et al. |
| 2002/0059141 A1 | 5/2002 | Davies et al. |
| 2002/0069172 A1 | 6/2002 | Omshehe et al. |
| 2002/0077964 A1 | 6/2002 | Brody et al. |
| 2002/0077978 A1 | 6/2002 | O'Leary et al. |
| 2002/0087447 A1 | 7/2002 | McDonald et al. |
| 2002/0087471 A1 | 7/2002 | Ganesan et al. |
| 2002/0095443 A1 | 7/2002 | Kovack |
| 2002/0099826 A1 | 7/2002 | Summers et al. |
| 2002/0099936 A1 | 7/2002 | Kou et al. |
| 2002/0104006 A1 | 8/2002 | Boate et al. |
| 2002/0104017 A1 | 8/2002 | Stefan |
| 2002/0107788 A1 | 8/2002 | Cunnhingham |
| 2002/0143874 A1 | 10/2002 | Marquette et al. |
| 2002/0152163 A1 | 10/2002 | Bezos et al. |
| 2002/0156900 A1 | 10/2002 | Marquette et al. |
| 2002/0165949 A1 | 11/2002 | Na |
| 2002/0174010 A1 | 11/2002 | Rice, III |
| 2002/0178113 A1 | 11/2002 | Clifford et al. |
| 2002/0184507 A1 | 12/2002 | Makower et al. |
| 2002/0188869 A1 | 12/2002 | Patrick |
| 2002/0191548 A1 | 12/2002 | Ylonen et al. |
| 2002/0198806 A1 | 12/2002 | Blagg et al. |
| 2003/0001888 A1 | 1/2003 | Power |
| 2003/0018915 A1 | 1/2003 | Stoll |
| 2003/0023880 A1 | 1/2003 | Edwards et al. |
| 2003/0034388 A1 | 2/2003 | Routhenstein et al. |
| 2003/0037131 A1 | 2/2003 | Verma |
| 2003/0037142 A1 | 2/2003 | Munger et al. |
| 2003/0040995 A1 | 2/2003 | Daddario et al. |
| 2003/0041165 A1 | 2/2003 | Spencer et al. |

(56) References Cited

U.S. PATENT DOCUMENTS

| | | |
|---|---|---|
| 2003/0046587 A1 | 3/2003 | Bheemarasetti et al. |
| 2003/0046589 A1 | 3/2003 | Gregg |
| 2003/0051026 A1 | 3/2003 | Carter et al. |
| 2003/0055871 A1 | 3/2003 | Roses |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |
| 2003/0084647 A1 | 5/2003 | Smith et al. |
| 2003/0088552 A1 | 5/2003 | Bennett et al. |
| 2003/0093678 A1 | 5/2003 | Bowe et al. |
| 2003/0105981 A1 | 6/2003 | Miller et al. |
| 2003/0110399 A1 | 6/2003 | Rail |
| 2003/0115160 A1 | 6/2003 | Nowlin et al. |
| 2003/0119642 A1 | 6/2003 | Gates et al. |
| 2003/0149594 A1 | 8/2003 | Beazley et al. |
| 2003/0149874 A1 | 8/2003 | Balfanz et al. |
| 2003/0154171 A1 | 8/2003 | Karp et al. |
| 2003/0154403 A1 | 8/2003 | Keinsley et al. |
| 2003/0159072 A1 | 8/2003 | Bellinger et al. |
| 2003/0163700 A1 | 8/2003 | Paatero |
| 2003/0163733 A1 | 8/2003 | Barriga-Caceres et al. |
| 2003/0163739 A1 | 8/2003 | Armington et al. |
| 2003/0167229 A1 | 9/2003 | Ludwig et al. |
| 2003/0177067 A1 | 9/2003 | Cowell et al. |
| 2003/0191549 A1 | 10/2003 | Otsuka et al. |
| 2003/0204460 A1 | 10/2003 | Robinson et al. |
| 2003/0225688 A1 | 12/2003 | Dobbins |
| 2004/0031856 A1 | 2/2004 | Atsmon et al. |
| 2004/0049702 A1 | 3/2004 | Subramaniam et al. |
| 2004/0117409 A1 | 6/2004 | Scahill et al. |
| 2004/0153378 A1 | 8/2004 | Perkowski |
| 2004/0215514 A1 | 10/2004 | Quinlan |
| 2004/0254991 A1 | 12/2004 | Malik et al. |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086177 A1 | 4/2005 | Anderson et al. |
| 2005/0091126 A1 | 4/2005 | Junger |
| 2005/0120180 A1 | 6/2005 | Schornbach et al. |
| 2005/0193056 A1 | 9/2005 | Schaefer et al. |
| 2005/0278641 A1 | 12/2005 | Mansour et al. |
| 2006/0029261 A1 | 2/2006 | Hoffman et al. |
| 2006/0116949 A1 | 6/2006 | Wehunt et al. |
| 2006/0274970 A1 | 12/2006 | Seki et al. |
| 2007/0067828 A1* | 3/2007 | Bychkov ............... G06F 21/31 726/3 |
| 2011/0231650 A1* | 9/2011 | Coulier ............... H04L 63/0435 713/151 |

FOREIGN PATENT DOCUMENTS

| | | |
|---|---|---|
| EP | 855659 | 7/1998 |
| EP | 884877 | 12/1998 |
| EP | 917119 | 5/1999 |
| EP | 1014318 | 6/2000 |
| EP | 1022664 | 7/2000 |
| EP | 1056043 | 11/2000 |
| EP | 1089516 | 4/2001 |
| JP | 10187467 | 7/1998 |
| JP | 2003-24329 | 11/2000 |
| JP | 2001-134672 | 5/2001 |
| JP | 2005-242976 | 9/2005 |
| WO | 97/43736 | 11/1997 |
| WO | 99/40507 | 8/1999 |
| WO | 99/52051 | 10/1999 |
| WO | 00/68858 | 11/2000 |
| WO | 01/18656 | 3/2001 |
| WO | 01/35355 | 5/2001 |
| WO | 01/43084 | 6/2001 |
| WO | 01/88659 | 11/2001 |
| WO | 02/17082 | 2/2002 |
| WO | 2004/079603 | 9/2004 |

OTHER PUBLICATIONS

Primavera Systems Delivers Expedition Express, Bus. Wire, Feb. 23, 1999.
Primavera Systems, Inc., Expedition Contract Control Software Version 6.0 User's Guide (1998).
Primavera Systems, Inc., http://www.primavera.com (1999).
Primavera Systems, Inc., Primavera and PurchasePro.com to Create E-Commerce Marketplace for Construction Industry, Sep. 21, 1999, available at http://web.archive.org/web/2000412175935/http://www.purchasepro.com (last visited Jun. 23, 2005).
Product Data Integration Technologies, Inc., http://www.pdit.com (last visited Apr. 26, 1999).
Richard Mitchell, Netlink Goes After an Unbanked Niche, Card Tech., Sep. 1999, at 22.
Robert Barnham, Network brings together producers and companies, Feb. 1, 1994, at 80.
Roberta Fusaro, Builders moving to Web tools, ComputerWorld, Nov. 16, 1998, at 51.
Robyn Meredith, Internet bank moves closer to virtual reality, USA Today, May 5, 1995, at B1.
Safe Single-Sign-On Protocol with Minimal Password Exposure No-Decryption, and Technology-Adaptivity, IBM Technical Disclosure Bulleting 38:3, pp. 245-248 (Mar. 1995).
Server/Applet/HTML Authentication Process with Single Sign-On, IBM Research Disclosure 429128, pp. 163-165 (Jan. 2000).
Shimon-Craig Van Collie, Construction Loan Tool from PriMerit, New Trend, Bank Mgmt., Apr. 1990, at 60.
Siebel Systems, Inc., http://www.siebel.com (last visited Nov. 17, 1999).
SmartAxis bv, http://www.smartaxis.co.uk/seller/howitworks.html (last visited Feb. 23, 2001).
Steven Marlin, Chasing document management, Inform, pp. 76-82 (Apr. 1999).
Stuart J. Johnston, Pondering Passport: Do you trust microsoft with you data?, PC World, Sep. 24, 2001.
Sun Microsystems, Applets, http://java.sun.com (last visited May 21, 1999).
Sun Microsystems, JAVA Remote Method Invocation Interface, http://java.sun.com (last visited May 21, 1999).
Sun Microsystems, JAVA Servlet API, http://java.sun.com (last visited May 21, 1999).
Sun Microsystems, JAVA Technology in the Real World, http://java.sun.com (last visited May 21, 1999).
Sun Microsystems, JNDI Overview, http://java.sun.com (last visited May 21, 1999).
Sun Microsystems, Staying in Touch with JNDI, http://java.sun.com (last visited May 21, 1999).
Sun Microsystems, The JDBC Data Access API, http://java.sun.com (last visited May 21, 1999).
Temporary Global Passwords, IBM Technical Disclosure Bulletin 26:3, pp. 451-453 (Mar. 1993).
The check is in the E-mail, Info. Today, Mar. 1, 1995, at 43.
ThomasNet, Inc., http://www.thomasnet.com (last visited Apr. 26, 1999).
ThomasNet, Inc., SoluSource for Engineers by Engineers, http://www.solusource.com (last visited Apr. 26, 1999).
Timothy M. Chester, Cross-Platform Integration with XML and SOAP, IP Pro, pp. 26-34 (Sep./Oct. 2001).
Tom Jepsen, SOAP Cleans up Interoperability Problems on the Web, IT Pro, pp. 52-55 (Jan./Feb. 2001).
Tomas Hernandez Jr., Software Solutions, Building Design & Construction, Nov. 1999, at 38.
U.S. Small Business Administration, PRO-Net, www.sba.gov (last visited Jun. 8, 1999).
V. Ryan et al, Internet Engineering Task Force, Schema for Representing CORBA Objects in an LDAP Directory (work in progress), http://tools.ietf.org/html/draft-ryan-corba-schema-00 (Apr. 15, 1999).
Vanessa Houlder, OFT gives the individual top priority, Fin. Times, Jun. 8, 1994.

(56) References Cited

OTHER PUBLICATIONS

VISA International, Consortium Created to Manage Common Electronic Purse Specifications, http://www.visa.com/av/news/PRmisc051199.vhtml (last visited Feb. 23, 2001).
W. Richard Mosig Jr., Software Review: The Construction Project Manager, Cost Engineering, Jan. 1996, at 7.
Wingspan Bank, At Your Request, http://www.wingspanbank.com (last visited Aug. 10, 1999).
ABC News Internet Ventures, Getting Smart with Java, http://abcnews.go.com/sections/DailyNews/amex_java000606.html (last visited Jun. 6, 2000).
Amy Cortese et al, Cyberspace: Crafting software that will let you build a business out there, Bus. Week, Feb. 27, 1995 at 78.
Amy K. Larsen, Internet Goes to Work for Builders, InternetWeek, Nov. 16, 1998, at 26.
Anne Knowles, Improved Internet security enabling on-line commerce, PC Week, Mar. 20, 1995.
Anne Thomas, Sun Microsystems, Enterprise Javabeans Technology, http://java.sun.com (last visited May 21, 1999).
Associates National Bank (Delaware), Our Cards, http://www.theassociates.com (last visited Apr. 6, 1999).
Aversion Therapy: Banks overcoming fear of the 'Net to develop safe Internet-based payment system with Netscape Communicator, Network World, Dec. 12, 1994.
Barry D. Bowen, Sun Microsystems, Banking on JAVA Technology, http://java.sun.com (last visited May 21, 1999).
Bechtel Construction Operations Incorporated Standardizes on Primavera's Expedition Contract Management Software, Bus. Wire, Jul. 27, 1999.
Calyx Software, POINT for Windows Version 3.x Interface Marketing Guide (Dec. 8, 1999).
David Bank, Cash, Check, Charge—what's next?, Seattle Times, Mar. 6, 1995, at D-1.
David D. Owen, Facilities Planning and Relocation 108, 110, 112-114, 117-127, 137-138, 199-217, 241, 359 (R.S. Means Company, Inc. 1993).
David G. Cotts, The Facility Management Handbook 135-40 (2d ed. 1998).
David P. Kormann et al, Risks of the Passport Single Signon Protocol, 33 Computer Networks 51-58 (2000).
David Post, E-Cash: Can't Live With It, Can't Live Without It, Am. Lawyer, Mar. 1995, at 116.
Dominique Deckmyn, San Francisco Manages $45M Project via Web-Based Service, ComputerWorld, Aug. 9, 1999, at 14.
Don Clark, Microsoft, Visa to Jointly Develop PC Electronic-Shopping Software, Wall St. J., Nov. 9, 1994, at B9.
eCharge Corporation, http://www.echarge.com/company/index.htm (last visited Dec. 3, 1999).
FreeMarkets Online, Inc., http://www.freemarkets.com (last visited Apr. 1999).
G&D America's Multi-application Smart Card Selected for Combined Payroll and 'Virtual Banking' Program in Mexico, Bus. Wire, Apr. 24, 1998.
GE TPN Post Service Use Guidelines, Getting Started (Apr. 26, 1999).
GE TPN Post Service Use Guidelines, Resource Center (Apr. 26, 1999).
Gerry Vandenengel, Cards on the Internet: Advertising on a $3 Bill, World Card Tech., Feb. 1995, at 46.
Harris InfoSource, http://www.harrisinfo.com (last visited Apr. 26, 1999).
Hewlett-Packard Co., Understanding Product Data Management (Apr. 26, 1999).
Jeffrey Kutler, A different drummer on the data highway, Am. Banker, May 12, 1995, at 14.
Jeffrey Kutler, Cash Card Creator Looking Beyond Mondex, Am. Banker, Feb. 9, 1995, at 16.
John N. Frank, Beyond direct mail, CreditCard Mgmt., Aug. 1996, at 54.
Jonathan Berry et al, Database: A Potent New Tool for Selling, Bus. Week, Sep. 5, 1994, at 56.
Karen Epper, A player goes after big bucks in cyberspace, Am. Banker, May 5, 1995, at 17.
Keith Brown, The Builder's Revolution, BuildNet Publishing (1996).
Kennedy Maiz, Fannie Mae on the Web, Newsbyte, May 8, 1995.
Kim A. Strassel, Dutch Software Concern Experiments with Electronic 'Cash' in Cyberspace, Wall St. J., Apr. 17, 1995, at B6.
Ko Fujimura et al, A World Wide Supermarket Scheme Using Trading Rights System, Proc. 7th Int'l Conf. on Parallel and Distributed Systems: Workshops, pp. 289-294 (Jul. 2000).
Ko Fujimura et al, XML Voucher: Generic Voucher Language, Internet Engineering Task Force, http://www.ietf.org/proceedings/03mar/I-D/draft-ietf-trade-voucher-lang-05.txt (Feb. 2003).
Lester D. Taylor, Telecommunications Demand Analysis in Transition, IEEE Proc. 31st Int'l Conf. on System Sciences, pp. 409-415 (1998).
Lynda Radosevich, Is workflow working?, CNN.com (Apr. 6, 1999), http://www.cnn.com/TECH/computing/9904/06/workflow.ent.idg.
M. Alshawi et al, An IFC Web-Based Collaborative Construction Computer Environment: Wisper, Proc. Int'l Conf. Construction IT (1999).
Markus Jakobsson et al, Secure and lightweight advertising on the Web, 31 Computer Networks 1101-1109 (1999).
Marvin Sirbu et al, NetBill: An Internet Commerce System Optimized for Network Delivered Services, IEEE Personal Comm., pp. 34-39 (Aug. 1995).
Mary C. Lacity et al, The Information Outsourcing Bandwagon, 35 Sloan Mgmt. Rev. 73 (1993).
Method of Protecting Data on a Personal Computer, IBM Technical Disclosure Bulletin 26:6, p. 2530 (Nov. 1985).
Muse Teohnologies, Inc., http://www.musetechnologies.com (last visited Apr. 26, 1999).
Nelson E. Hastings et al, A Case Study of Authenticated and Secure File Transfer: The Iowa Campaign Finance Reporting System (ICFRS), Performance, Computing and Comm. Conf., pp. 532-538 (Feb. 1997).
Object Management Group, CORBA for Beginners, http://www.omg.org (last visited May 25, 1999).
Object Management Group, CORBA Overview, http://pent21.infosys.tuwein.ac.at (last visited May 25, 1999).
Object Management Group, Library, http://www.omg.org (last visited May 25, 1999).
Object Management Group, What is CORBA?, http://www.omg.org (last visited May 25, 1999).
Omware, Inc., http://web.archive.org/web/20000226033405/www.omware.com/products.html (last visited Nov, 28, 2005).
Paul Seibert, Facilities Planning & Design for Financial Institutions 15, 272, 274-77 (1996).

\* cited by examiner

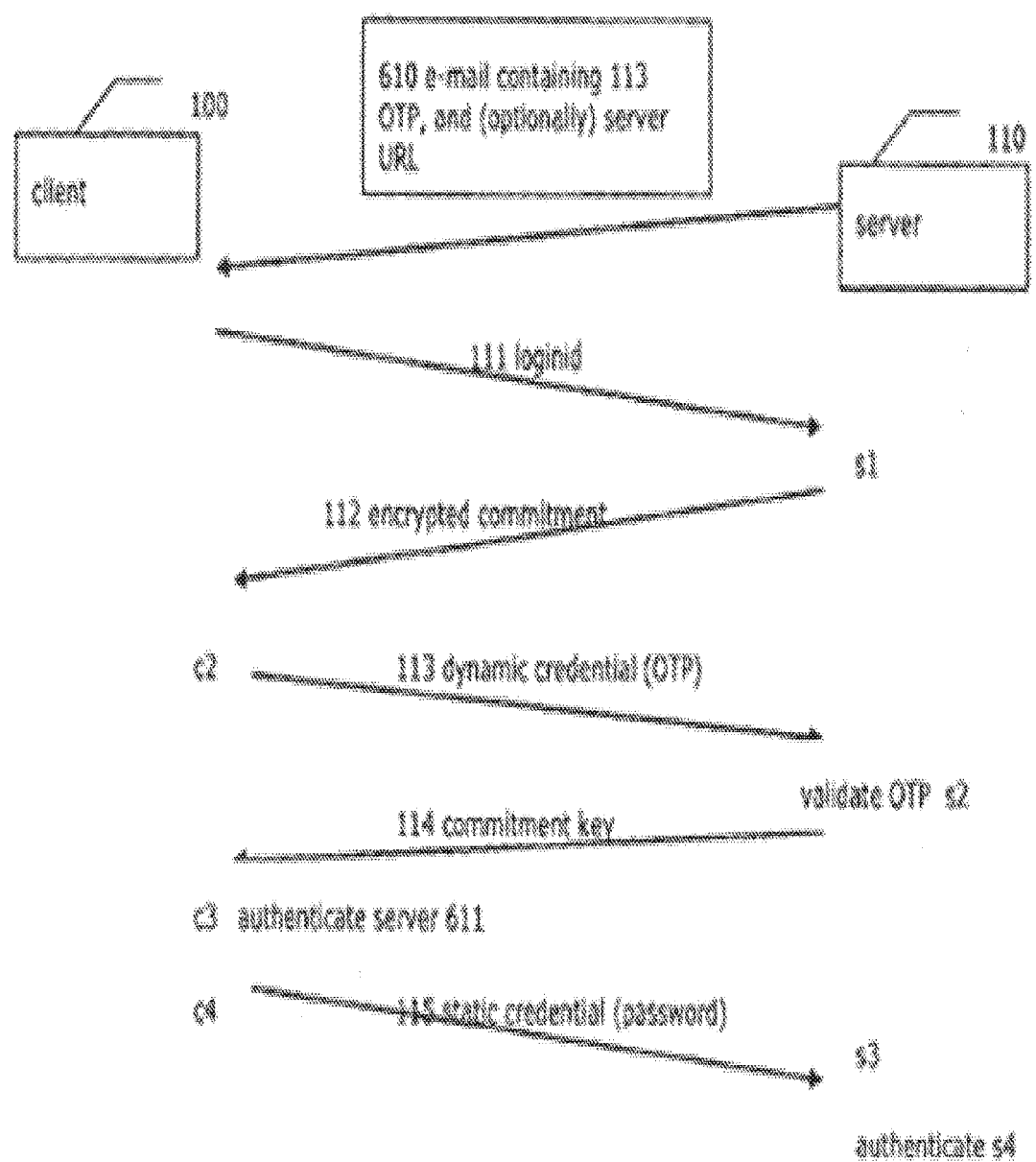

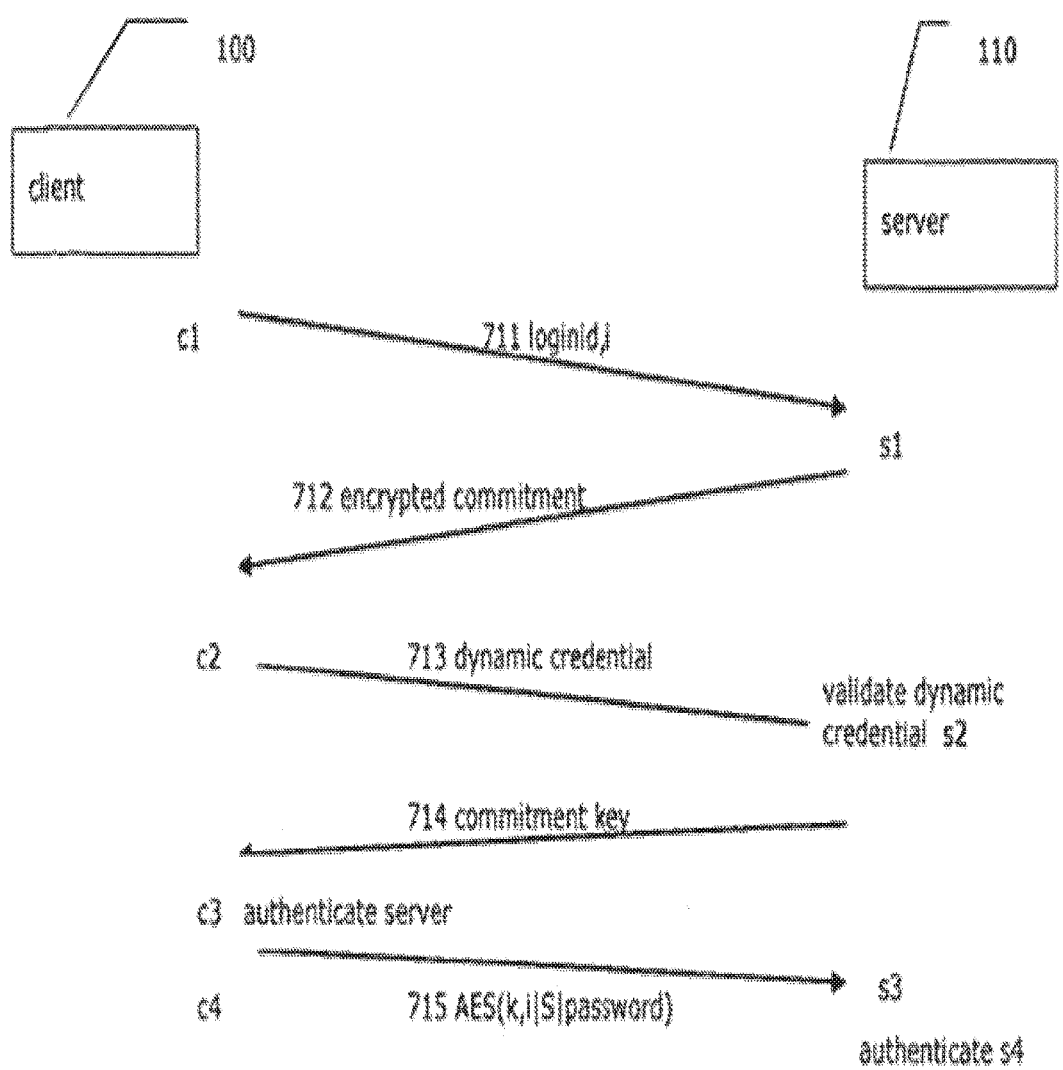

SYSTEM AND METHOD FOR ANTI-PHISHING AUTHENTICATION

RELATED APPLICATIONS

This application is a continuation application of U.S. patent application Ser. No. 14/051,079 filed on Oct. 10, 2013, which is a continuation application of U.S. patent application Ser. No. 11/411,576 filed on Apr. 26, 2006, which in turn claims the benefit of priority under 35 U.S.C. §119(e) to U.S. Provisional Patent Application Serial No. 60/718,503 filed on Sep. 19, 2005, all of which are hereby incorporated in their entirety.

CROSS-REFERENCE TO RELATED APPLICATIONS

This application is a continuation application of U.S. application Ser. No. 11/411,576 , filed Apr. 26, 2006 , which in turn claims the benefit of priority under 35 U.S.C, §119(e) to U.S. Provisional Patent Application No. 60/718,503 , filed Sep. 19, 2005. U.S. application Ser. No. 11/411,576 and U.S. Provisional Patent Application No. 60/718,503 are hereby incorporated by reference herein in their entireties.

FIELD OF THE INVENTION

The present invention relates generally to computer security, and, more particularly, to systems and methods for providing security against phishing and other attacks.

BACKGROUND OF THE INVENTION

In computing, phishing is a form of social engineering, characterized by attempts to fraudulently acquire sensitive information, such as passwords and credit card details, by masquerading as a trustworthy person or business. The objective is to lure a user to connect and present authentication credentials to an illegitimate party who masquerades as another. Sometimes, the phisher fools the user by sending an apparently official electronic communication, such as an email or an instant message. The term phishing arises, in part, from the use of increasingly sophisticated lures to "fish" for users' financial information and passwords.

More recent phishing attempts have started to target the customers of banks and online payment services. While the first such examples were sent indiscriminately in the hope of finding a customer of a given bank or service, recent research has shown that phishers may in principle be able to establish what bank a potential victim has a relationship with, and then send an appropriate spoofed email to this victim. In general, such targeted versions of phishing have been termed spear phishing.

The damage caused by phishing ranges from loss of access to email to substantial financial loss. This style of identity theft is becoming more popular, because of the ease with which unsuspecting people often divulge to phishers personal information, including credit card numbers and social security numbers. Once this information is acquired, the phishers may use a person's personal information to create fake accounts in a victim's name, ruin a victim's credit, or even prevent victims from accessing their own accounts.

In one type of phishing attack, known as a man-in-the-middle attack, an attacker tricks a client into pointing his or her browser at the attacker's login page. In such scenarios, the attacker sends an e-mail message to the client, asking the client to login to a Web site posing as a legitimate corporate site. Next, the client logs into the attacker's site, thus divulging the client's authentication credentials. The attacker then uses the client's authentication credentials to login to the legitimate corporate site.

Some phishing vulnerabilities can be mitigated by use of a One-Time Password (OTP). Unlike a conventional password, an OTP has only a limited usefulness to an attacker. In a common scenario, a time-based OTP is only valid for a few minutes, such as that provided by RSA's SecurID® system, as is known to those skilled in the art. A secure server executes security software which validates a particular OTP. If a phisher discovers the value of the OTP, then the phisher cannot store the value for later reuse, because the OTP's usefulness quickly expires. Rather, the phisher must exploit the OTP immediately and launch an attack. Some OTP systems increase the difficulty of an attack by providing additional security controls which limit the acceptance of an OTP to a single use even within the limited validity period. However, the use of a OTP does not completely solve the Phishing issue. For example, an attacker may obtain use of an OTP a single time.

In a common man-in-the-middle scenario, an attacker relays an entire session between the client and the legitimate server. While in the middle, the attacker views the entire session, harvesting account numbers and possibly other important information. Upon acquiring this information, the attacker can potentially interact with the legitimate server directly. With reference to FIG. 1, there is shown an exemplary man-in-the-middle attack. FIG. 1 illustrates that the client 100 attempts to connect to a server 110. Unfortunately, a phisher 11 (acting in the role of man-in-the-middle) captures the entire session and thereby discovers confidential information. The phisher 11 opens a channel to the server 110 and simply copies everything that it receives from either the client 100 or the server 110 into its own unauthorized log 19. First, the client 100 mistakenly connects to the phisher 11 and sends authentication credentials 10. The server copies the message that it receives into the unauthorized log 19, and forwards an exact copy of the message to the server 110 in message 12. The server 110 authenticates and responds 14. The phisher 11 copies the response into the unauthorized log 19, and returns the response 13 to the client 100. The client subsequently interacts 15, and the phisher 11 captures all information and copies into the unauthorized log 19, and forwards the interactions 16 to the server 110. The server 110 also sends interaction responses 16 which the phisher 11 copies to the unauthorized log 19 and returns the interactions 15 to the client 110. Eventually, the client 100 finishes the interaction and logs out 17, and the phisher copies the logout message to the unauthorized log 19 and sends the logout 18 to the server 110. The final result of the session is that the client performed all work as intended without detecting any attack. The phishers, however, has captured all information transmitted in the session and stored that information in an unauthorized log 19.

Thus, there is a need for an improved system and method for providing security against phishing attacks. Embodiments of the invention serve to protect against attacks such as that described above with respect to the description of FIG. 1.

Two-factor authentication is a means by which a peer may authenticate to another party by presenting two or more of the following: something the user knows, e.g., a password; something the user has, e.g., physical possession of an authentication device; and something the user is, e.g., a thumb print. Three-factor authentication is a means which requires an additional factor beyond two-factor authentication such as a biometric.

Two-factor authentication, however, typically employs a conventional password coupled with a stronger form of authentication, such as, for example, a OTP on a token. In such an arrangement, the purpose of the password is to protect the authentication mechanism in the case that the user loses the stronger authentication factor (e.g., if the user loses an OTP token), and then the password protects against the possibility of usage by the attacker.

The factors in a multiple-factor authentication may be either static or dynamic as follows: a static credential factor, otherwise called a static credential, remains constant until the owner of the static credential explicitly participates in an event which changes the credential in a meaningful way. For example, a password is a static credential. If the user wishes to change the password, the user must explicitly initiate the change password process.

A dynamic factor, otherwise called a dynamic credential, changes automatically. The following are examples of dynamic credentials:

OTP: a one-time-password automatically changes upon each use. An exemplary OTP is the password provided by an RSA SecurID® token (numbers or letters that appear on the token's screen). The value displayed by the token changes periodically, and the servers ensure that they do not accept a single token value more than once per period. Another example is a list of passwords. After the user submits one password from the list to the server, the servers are configured such that the user must submit a password that appears later in the list in a subsequent authentication event.

In a multiple-factor authentication mechanism, suppose an attacker were to discover the value of a dynamic credential without knowing the value of the corresponding static credential. In this case, the attacker could not successfully login because the attacker would not know the value of the static credential. Knowledge of the dynamic credential would become useless at the event in which the dynamic credential changes value. For example, suppose an OTP were accepted by the server for three minutes. Further suppose that the attacker were to discover the value of the dynamic credential. In this case, the attacker must discover the value of the static credential before the expiration of the three-minute time window in order to use the dynamic credential in a meaningful way. Otherwise, at the expiration of the three-minute time window, the attacker's knowledge of the expired dynamic credential value would become useless. Multiple-factor authentication requires at least two factors.

Mutual authentication is a means in which peers in a communication each authenticate the other. If a first peer communicates with a second peer, then the first peer requires that the second peer provide credentials. Once validated by the first peer, these credentials demonstrate the second peer's identity. Additionally, the second peer requires that the first peer provide credentials. Once validated by the second peer, these credentials demonstrate the first peer's identity.

SUMMARY OF THE INVENTION

Embodiments of the present invention provide improved systems and methods for anti-phishing authentication.

Embodiments provide security, even if an attacker may potentially discover the value of the dynamic credential, by ensuring that the client does not send the value of the static credential over any network until the client authenticates the server.

Some embodiments provide a sequence of OTPs that appear to be a random sequence.

Some embodiments protect a client from a phishing attack by way of a method wherein a server cannot provide information that could potentially aid an attacker until the server confirms the client's identity, and a client cannot provide information that can be used in a phishing attack until the client confirms the server's identify.

In some embodiments, the method includes the client providing a login ID to the server. Next, the server provides an encrypted commitment to the client. Next, the client provides an OTP to the server. Then, the server validates the OTP, and sends a commitment key to the client. Upon receiving the commitment key, the client authenticates the server, and provides a static password to the server. Upon receipt of the static password, the server authenticates the client.

Thus, by way of embodiments of the invention, additional security against phishing attacks can be provided.

BRIEF DESCRIPTION OF THE DRAWINGS

The present invention will be more readily understood from the detailed description of exemplary embodiments presented below considered in conjunction with the attached drawings, of which:

FIG. 3 illustrates an exemplary mechanism related to allowing a client to match a distinguished name in a SSL (TLS) certificate, to protect a connection with the a server; and FIG. 4 illustrates an exemplary mechanism related to allowing use of an event-based token.

Figure 1:
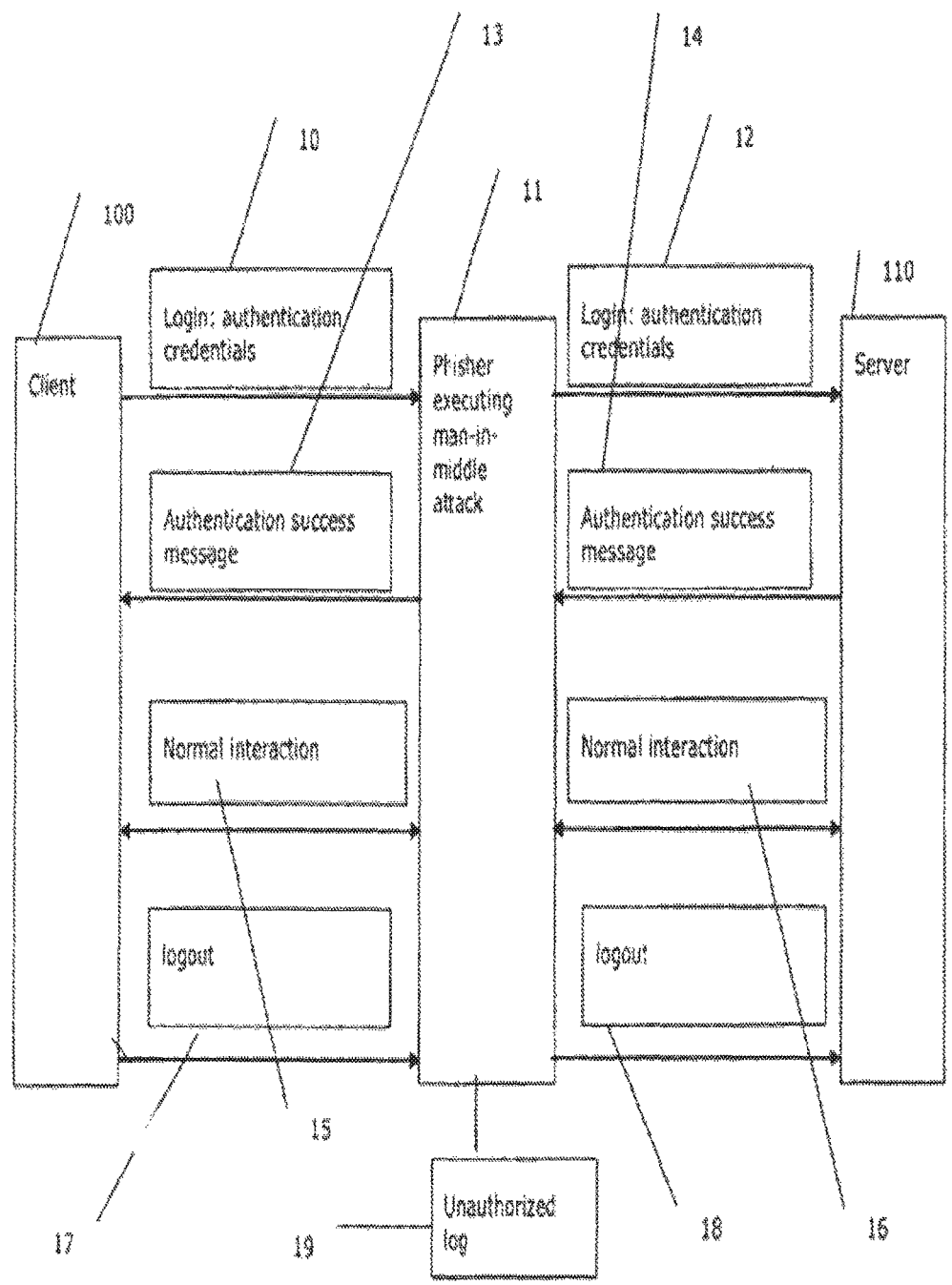
FIG. 1 is an exemplary flow diagram illustrating information related to a phishing attack.

It is to be understood that the attached drawings are for purposes of illustrating the concepts of the invention.

DETAILED DESCRIPTION

Embodiments of the invention provide for security against phishing attacks. In one such embodiment, before attempting to authenticate, the client opens an SSL or TLS connection with the server. At this point, neither the client, nor the server have authenticated the remote peer. In the SSL or TLS connection, the server uses a certificate with a distinguished name.

This embodiment can include a time-based OTP in which the OTP value is generated as is described in further detail below. In some embodiments, assume that a tamper-resistant authentication token similar to SecurID generates the OTP value, or other known token as is known to those skilled in the art.

With embodiments of the invention, the client does not submit his or her static credential until the client discovers the identity of the server. Otherwise, the client would be providing sufficient information for an attacker to launch a man-in-the-middle phishing attack. On the other hand, the server needs to carefully control the information that it sends over networks to its peer (as described herein, the server and the client are considered to be peers), until the server authenticates the peer as the legitimate client. This issue is a problem because both peers must be extremely careful when they divulge information in any period that precedes authentication of the peer.

To provide security against phishing attacks, a system requires protection of a dynamic credential of multiple-factor authentication. With such protection, the user does not reveal the static credential until he or she authenticates the server.

Another beneficial aspect of some embodiments is that key entropy (e.g., number of bits of randomness that contribute to choosing the value of the key) is not restricted in the cryptographic calculations. Thus, in some embodiments, keys that are used to protect a static password are not limited by entropy. The server cannot provide information that could potentially aid an attacker until the server confirms the client's identity. Likewise, the client cannot provide information that can be used to successfully launch a phishing attack until the client confirms the server's identity.

The client 100 has access to the current value produced by a token which generates one-time passwords used as dynamic credentials. As used herein, the values of these one time passwords are designated as: t1, t2, t3, ..., etc. In some embodiments, each OTP value appears on the token for a fixed amount of time. When the time period expires, the token displays the next token code. At the ith period, the token code displays ti. At the i+1th period, the token code displays t(i+1). For example, if the values displayed by the token during the first three periods are 381291, 583920, and 393271, respectively, then t2=583920.

In such embodiments, the server 110 and the token generate the sequence of token code values t1, t2, t3, ..., using a method that references a secret key, k 401. Each token has a unique secret key, k 401, and the server 110 has access to a copy of the secret key, k 401. At each time period, i, both the token and the server 110 calculate an intermediary value, xi 402, using the following method $$xi=h(AES(k,h(i|CONST))).$$

where:

CONST is a known constant value such as: 123456789.

i|CONST is the value i concatenated onto the constant value. For example, if i=3, then i|CONST=3123456789.

h(z) is a one-way message digest algorithm computed over value z. An exemplary one-way message digest algorithm is SHA-256, as is known to those skilled in the art.

AES(a,b) is a symmetric encryption algorithm such as the Advanced Encryption Standard, as is known to those of skill in the art, using (key a) for the purpose of producing encrypted value, given (plaintext value b).

A purpose of this method is to generate a sequence of random-appearing values xi, Each token uses the same method to generate the sequence x1, x2, x3, ...; however, each token has a different secret key. For example, another token may use secret key, k', and this second token generates the following value xi in the ith time period: h(AES(k',h(i|CONST)))

The token stores each value xi that it generates in its internal storage without revealing each xi to the client, or any other party. The token generates the token code value 113, (also known as ti or OTP) using the following method:

$$ti=f(h(S|xi),n)$$

where:

S is the distinguished name of the server 110.

S|xi is the distinguished name of the server 110 concatenated with the value xi (the vertical bar | denotes the concatenation operation)

f(z,n) is a function that extracts the high-order n digits of base-10 value z. For example, f(123456789,2)=12 and f(987654321,5)=98765.

Thus, in time period i, the token generates the current OTP value 113 (also known as ti) using the following method, where it is assumed that the client and server agree on a value of n through an out-of-band means, e.g., a fixed value of n is programmed into the token and the server's algorithm for generating token values.

$$ti=f(h(S|h(AES(k,h(i|CONST)))),n)$$

Since the server 110 can determine the same secret key, k 401, and the method for generating ti, the server 110 also can determine how to calculate each ti. Since, for this example, it is assumed that no other party knows the secret key, k 401, no other party can discern ti, except through random guesses.

Figure 2:
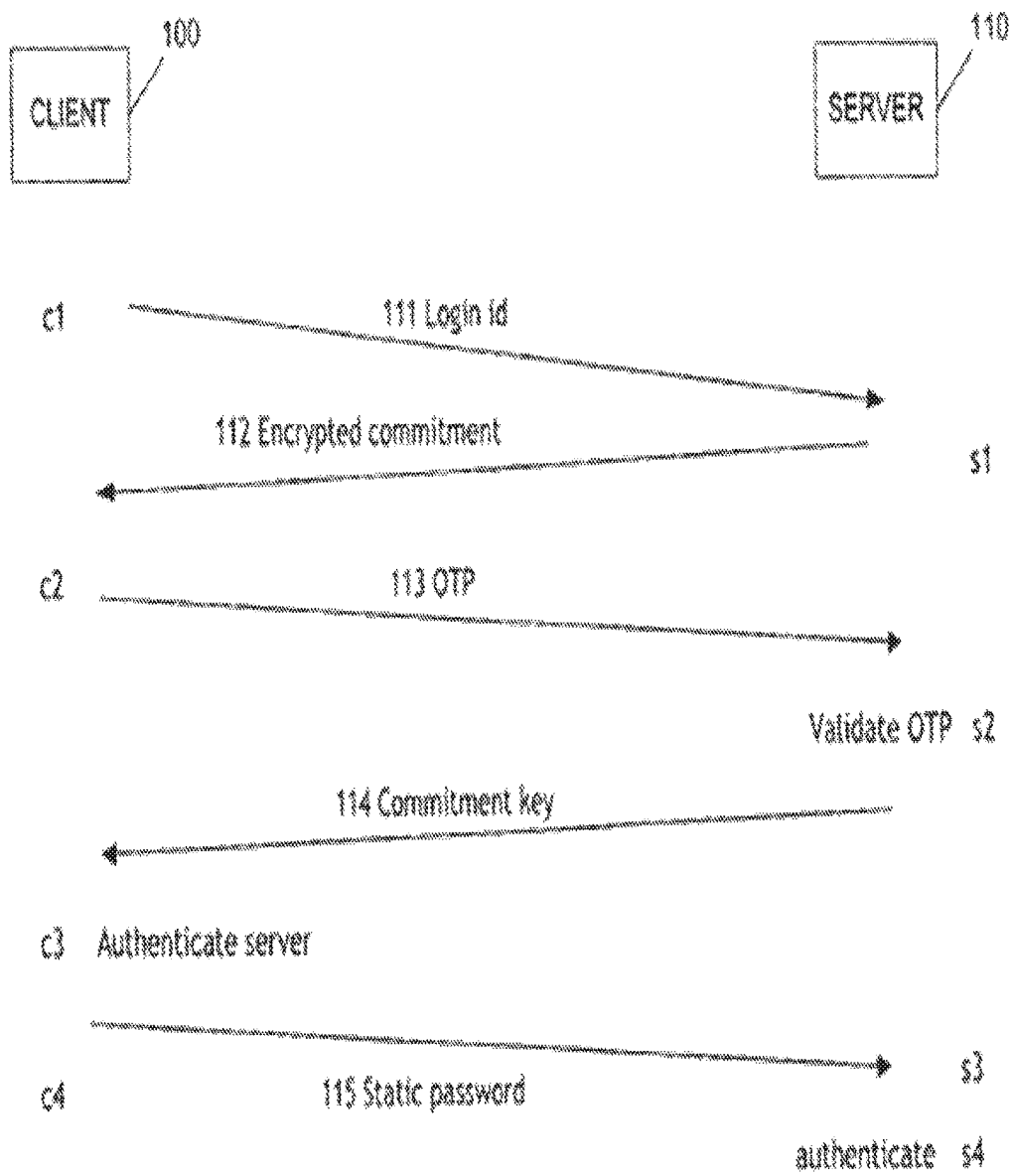
FIG. 2 is an exemplary flow diagram illustrating a method for providing security against phishing attacks, in accordance with an embodiment of the present invention.

With reference to FIG. 2, there is shown an exemplary flow diagram illustrating a method for providing security between a client 100 and a server 110 against phishing attacks. In any of the steps described herein, if a validation fails, then the party that notices the failure terminates the protocol immediately and does not proceed to the next step. By way of the method, in c1 the client initiates the protocol by opening an SSL (Secure Socket Layer)(TLS (Transport Layer Security)) session. In step 111, the client 100 provides a user identification code (id) without any accompanying authentication information. In this step, the server 110 can determine the identity of the client 100, but cannot yet authenticate the client 100. With this step, the client 100 does not divulge confidential authentication credential information that could be used by an attacker.

In s1, the server calculates the client's 100 current value of ti, and then computes a commitment value. As used herein, a commitment value is a value used for sending hidden information such that it is verifiable in spite of possible later bias from either the sender or the receiver. With step 112, a commitment value confirms that the server 110 has determined the value that is currently displayed on the client's 100 token. However, at the time of step 112, the commitment value appears to the client 100 as a sequence of random-appearing numbers: and the client 100 cannot understand the full meaning of the commitment value until a later step. In some embodiments, the commitment value can be calculated as follows:

Commitment value in time period i: $yi=h(h(S|xi))$.

At the time that the client 100 receives the commitment, the client 100 does not have enough information to validate the commitment value. The commitment value provides no information that could be used by an attacker to compromise either the server 110 or the client 100. In addition, an attacker cannot forge a correct commitment value because an attacker does not know k, and therefore cannot calculate xi. In c2, the client 100 stores the encrypted commitment 112.

In step 113, the client 100 sends the current OTP displayed on the token (also known as ti). In some embodiments, then token displays the OTP. The OTP can be calculated as follows:

$$OTP\ value = t_i = f(h(S|x_i), n),$$

In such a scenario, the OTP has little use to an attacker unless the attacker can determine the second factor associated with the token, i.e., the password (static credential). Although the client 100 reveals important authentication credential information, this information is not directly useful in the case of an attack. If the attacker does not discover the value of the static credential during time period i, then the attacker's discovery of ti has little use.

Upon receipt in s2, the server 110 then validates the OTP by calculating ti, and comparing against the value received in 113. This validation step serves to demonstrate evidence that the client 100 possesses the correct token, but it does not fully authenticate the client 100.

With further reference to FIG. 2, in step 114, the server 110 sends the commitment key (xi 114) to the client 100. By divulging xi, the server 110 provides the client 100 with the ability to generate a token code. Note that, at this step in the process, the server has already received ti and in order to ensure one-time semantics, the server refuses receipt of any other copies of ti, for this present value of i. Since the server already received ti, release of xi over the network yields little potential value to any possible attackers.

In c3, the client 100 uses xi in the following calculations:

$$z = h(h(S|x_i))$$

$$w = f(h(S|x_i), n)$$

If z is identical to the encrypted commitment 112, and w is identical to the token code value ti=OTP 113, sent in step 113

Then the client 100 accepts the commitment key 114. Otherwise, validation fails. That is, if either the check of z, or the check of w, or both checks, fail, then the client 100 stops the authentication mechanism immediately, and does not send the value of step 115. In the calculations of w and z, the client uses the value S extracted from the server's certificate in the current SSL (TLS) session.

In c3, by validating the commitment, the client 100 determines the following:

The remote party knew the value of the OTP 113 before the client sent the OTP 113. Therefore, the remote party knew the unique symmetric key k, The token produced an OTP 113 which is consistent with a value produced using a method that references distinguished name S.

The current SSL (TLS) session connects with a server which has a certificate with distinguished name S.

This evidence is sufficient for convincing the client to send its static password 115, By using the distinguished name the server's SSL (TLS) certificate, the client obtains evidence that its peer is correct, i.e., not an attacker, or man-in-the-middle.

By way of embodiments of the invention, because the client 100 does not divulge its static password in c4 until after it completely validates the server 110, the client 100 can determine that it is not divulging sensitive information to an attacker when the client sends the static password. Once the server 110 obtains both authentication factors, the server 110 can correctly authenticate the client 100. Therefore, at the conclusion of step 115 in s3 the server receives the static credential. In s4, the server uses this credential to complete the authentication. That is, s4 when coupled with s2 validates both the OTP and the static credential. Considering the fact that the client authenticated the server in c3, at the conclusion of s4, the client and server have mutually authenticated.

In some embodiments, the commitment value algorithm computes the message digest twice. Some embodiments use message digests that include a data hiding property. In some embodiments, a double message digest may be used to enhance security. Exemplary algorithms used can include, for example, Message Digest: SHA-1, or SHA-256.

In some embodiments, the client 100 can be implemented with client-side code, such as an applet or an ActiveX control. The client-side code can perform the tasks of storing the token value between steps 113 and 115, discussed above. The client-side code can also perform client-side message digests and cryptographic steps, as described above.

In some embodiments, the client 100 obtains the client-side code once, and does not obtain further client-side code unless that code is signed by the correct peer.

In some embodiments, if the server 110 and client 100 are not identically synchronized, the server 110 can send multiple commitment values in the same message: yi−2 yi−1 yi yi+1 yi+2. The client validates successfully if it can validate any of the commitments using the value xi.

In some embodiments, the server 110 can enhance data hiding of the commitment by encrypting the commitment with a symmetric algorithm, such as, for example, 3DES. In such an embodiment, in step 114, as described above, the server 110 sends both xi and a 3DES (Triple Data Encryption Standard) key.

Thus embodiments of the invention provide for systems and methods for providing security against phishing attacks. Advantageously, embodiments of the invention do not limit the entropy of any information communicated over a network. Such a result is contrary to known cryptographic solutions to phishing, which typically limit the entropy of communicated information.

Embodiments of the invention beneficially provide for security by embedding the server's 110 name, or identification, into the algorithm for generating OTP values.

Embodiments of the invention cryptographically tie the SSL (TLS) session to the OTP token, thus comparing the token's embedded server name against the SSL (TLS) certificate's distinguished name.

Thus, embodiments provide security against phishing attacks inventively by splitting the authentication process into multiple steps. First, using a commitment in an OTP authentication, and then, second, sending an OTP value in a step before the password, thereby protecting the most vulnerable portion of the authentication credential (the static password) until the end of the authentication process.

In alternate embodiments, additional steps may be added, certain steps may be excluded, certain steps may be performed multiple times, and/or the steps may be performed in a different order and/or simultaneously.

In certain embodiments of the invention, all of the steps of the method can be performed by a computer, or computing system, as described above. In alternative embodiments, one or more of the steps can be performed manually, by a person.

An exemplary embodiment is presented in FIG. 3. In 610, the server 110 sends a dynamic credential, e.g., OTP 113, to the client 100 via a potentially out-of-band method. As used herein, out-of-band means a transmission method that differs from the remainder of the communications. Examples of out-of-band transmission methods are e-mail, physical mail, and telephone messages. Alternatively, an in-band method can be employed. After receiving the message 610, the client 100 wishes to initiate a connection with the server 110. The client executes the steps as described above with respect to FIG. 2 (albeit with modification 611 as described below), to complete the connection in a manner in which the client 100 knows that it is connecting to the right server, i.e., the client 100 obtains anti-phishing assurance in the connection to the server. The client opens the SSL (TLS) after receiving message 610, but before sending message 111. This assurance helps protect the client 100 from sending its authentication credential (including any static credential 115) to any party other than the authorized server 110.

The mechanism described in FIG. 3 ensures that the client 100 matches the distinguished name in the SSL (TLS) certificate that protects the connection with the server 110, against the distinguished name that cryptographically corresponds to the dynamic credential (OTP) 113. If these distinguished names do not match, then the client 100 terminates the connection before sending the static credential 115. In the case of the method shown in FIG. 1, the client trusts the validity of this particular distinguished name because it relates to an OTP obtained from a trusted source (the client's own token). However, in the case of the method shown in FIG. 3, the client receives the OTP in an e-mail or possibly other untrusted channel. Therefore, the client 100 must execute an extra step to ensure validity of the distinguished name. The information collected for the extra step may occur at any point in the mechanism before c3, or at c3 itself. The decision that uses the extra information occurs at c3 as part of the mechanism to authenticate the server. Examples of this extra step include, but are not limited to, any one or more of the following mechanisms: displaying the distinguished name to the user, and waiting for the user to press and acknowledgement button; comparing the distinguished name against a list of names that reside in a trusted location on the client's machine, outbound proxy, or other location trusted by the client; and executing an algorithm that takes a distinguished name and possibly other sources of input such as the server's SSL (TLS) certificate, and producing a binary validity result as output. This algorithm may include a step of validating the SSL (TLS) certificate to ensure that it has a trusted root. Input into this algorithm may potentially include additional information that the user inputs at a prompt or the machine obtains through an interface. Examples of this additional information include the distinguished name that the user types at a prompt or copies from a mobile data source such as a USB memory stick.

In some embodiments, both credentials can be dynamic. In such embodiments, one of the credentials is protected to a greater extent than the other.

With reference to FIG. 4, in some embodiments, the token may generate the token value through an event based token, as is described in the counter example below. In some embodiments, the static credentials may be encrypted. In some embodiments, the client enters the static credential (password) into a program that never releases the static credential in plaintext form. In 711, the value i represents a counter as opposed to a time period; however the formulas remain unchanged with respect to the formulas described above with reference to FIG. 2. The counter increases upon each use. In 711, the client sends the loginid and the current counter value after opening the SSL (TLS) session (c1). The server validates that the counter value is greater than any that had previously been seen by the server. The client increases the counter value by one in order to prepare for its next use, The server executes s1, and in 712 sends the encrypted commitment. The client executes c2, and then in 713 the client sends the dynamic credential. The server executes s2 and in 714 sends the commitment key. In c3, the client authenticates the server. In 715 c4, the client encrypts i|S concatenated with the static credential (password) using k with encryption algorithm AES. The server decrypts using AES with key, k, and executes s3 and s4. The server validates i, S, and the static credential are as expected.

It is to be understood that the exemplary embodiments are merely illustrative of the invention and that many variations of the above-described embodiments can be devised by one skilled in the art without departing from the scope of the invention. It is therefore intended that all such variations be included within the scope of the following claims and their equivalents.

What is claimed is:

1. A method for providing security against phishing attacks during client access of a server, the method comprising:
providing from the server, upon initiation of a client-server session by the client, an encrypted commitment;
receiving at the server, a dynamic credential from the client, in response to receipt of the encrypted commitment;
validating the dynamic credential at the server;
upon successful validation, transmitting from the server, a commitment key to the client, the commitment key enabling the client to authenticate the server, wherein the client is prohibited from transmitting a static credential until the client authenticates the server.

2. The method of claim 1, further comprising receiving, from the client, a login ID to initiate the client-server session.

3. The method of claim 2, wherein the login ID is a time-based one time use password accessible to both the server and the client.

4. The method of claim 1, further comprising receiving, at the server the static credential upon authentication of the server by the client and authenticating the client at the server.

5. The method of claim 1, wherein if validation of the dynamic credential is unsuccessful, the server terminates the client-server session.

6. The method of claim 1, wherein client-side code stores the received encrypted commitment and the commitment key.

7. The method of claim 1, wherein the client lacks the ability to check validity of the commitment information until the server receives the dynamic credential.

8. The method of claim 1, further comprising embedding a name of the server into an algorithm for generating the dynamic credential.

9. The method of claim 8, further comprising providing from the server an email to the client containing the dynamic credential prior to initiation of the client-server session.

10. The method of claim 9, further comprising validating the server at the client utilizing the embedded server name.

11. A system for providing security against phishing attacks during client access of a server, the system comprising:
a server including a processor programmed and configured to perform the steps of:
providing from the server, upon initiation of a client-server session over a network by the client, an encrypted commitment;

receiving at the server, a dynamic credential from the client, in response to receipt of the encrypted commitment;

validating the dynamic credential at the server;

upon successful validation, transmitting from the server, a commitment key to the client, the commitment key enabling the client to authenticate the server, wherein the client is prohibited from transmitting a static credential until the client authenticates the server.

12. The system of claim 11, further comprising receiving, from the client, a login ID to initiate the client-server session.

13. The system of claim 12, wherein the login ID is a time-based one time use password accessible to both the server and the client.

14. The system of claim 11, further comprising receiving, at the server the static credential upon authentication of the server by the client and authenticating the client at the server.

15. The system of claim 11, wherein if validation of the dynamic credential is unsuccessful, the server terminates the client-server session.

16. The system of claim 11, wherein client-side code stores the received encrypted commitment and the commitment key.

17. The system of claim 11, wherein the client lacks the ability to check validity of the commitment information until the server receives the dynamic credential.

18. The system of claim 11, further comprising embedding a name of the server into an algorithm for generating the dynamic credential.

19. The system of claim 18, further comprising providing from the server an email to the client containing the dynamic credential prior to initiation of the client-server session.

20. The system of claim 19, further comprising validating the server at the client utilizing the embedded server name.

* * * * *